(12) United States Patent
Gebizlioglu

(10) Patent No.: US 6,287,657 B1
(45) Date of Patent: *Sep. 11, 2001

(54) ALL-PLASTIC AIR FEEDER PIPE

(75) Inventor: Osman S. Gebizlioglu, Flanders, NJ (US)

(73) Assignee: Telcordia Technologies, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,191

(22) Filed: Nov. 12, 1998

(51) Int. Cl.$^7$ ............................. F16L 11/06; B29D 23/00
(52) U.S. Cl. ..................... 428/36.91; 428/212; 428/213; 428/220; 428/421; 428/518; 138/118; 138/137; 138/141
(58) Field of Search ................. 428/36.91, 36.9, 428/421, 518, 516, 213, 212, 220; 138/137, 141, 118

(56) References Cited

U.S. PATENT DOCUMENTS 5,891,114 * 4/1999 Chien et al. ..................... 138/123
5,922,425 * 7/1999 Greuel .............................. 428/36.91
5,937,911 * 8/1999 Kodama et al. .................... 138/137
5,958,532 * 9/1999 Krause et al. ..................... 428/36.91

OTHER PUBLICATIONS

TR–TSY–000206, Technical Reference, Cable Pressurization Air Feeder Pipe, Issue 1, Apr. 1985.

CA3131—Gas Feeder Pipe, Mar. 1984, AT&T Technologiees.

* cited by examiner

Primary Examiner—Rena L. Dye
(74) Attorney, Agent, or Firm—Joseph Giordano; James Falh

(57) ABSTRACT

An all-plastic air feeder pipe having a tubular inner moisture barrier and a tubular outer layer. The inner barrier is made of a material having a relatively low permeability coefficient, while the outer layer material is of a relatively large permeability coefficient. By this arrangement an all-plastic low-cost pipe with improved moisture protection for a pressurized cable network can be constructed economically.

6 Claims, 3 Drawing Sheets

FIG. 1

| Material | Permeability Coefficient × $10^{10}$ $cm^3 \, cm^{-2} \, sec^{-1}$ | Tensile Modulus MPa | COST in $/lb. |
|---|---|---|---|
| Low Density Polyethylene (LDPE) | 90 | 55 - 172 | 0.30 – 0.45 |
| High Density Polyethylene (HDPE) | 12 | 400 - 1100 | 0.33 – 0.50 |
| Polypropylene (PP) | 51 | 1000 - 1750 | 0.27 – 0.40 |
| Poly (Vinylidene Chloride) (PVDC) | 0.5 | 340 - 550 | 1.62 |
| Fluorinated Ethylene – Propylene Copolymers (FEP) | 0.29 – 0.5 | 260 - 450 | 10.00 – 15.00 |

FIG. 2

| Inner Layer 1/16th in thick | Outer Layer 3/16th in thick | Equivalent Stiffness (N. m²) | Moisture Transmission Rate (m³/sec) |
|---|---|---|---|
| Aluminum | Low Density Polyethylene (LDPE) | 843.7 | – |
| Aluminum | High Density Polyethylene (HDPE) | 868.1 | – |
| Fluorinated Ethylene – Propylene Copolymers (FEP) | LDPE | 7.1 | $2.2 \cdot 10^{-11}$ |
| Poly (Vinylidene Chloride) (PVDC) | LDPE | 8.1 | $3.8 \cdot 10^{-11}$ |
| FEP | HDPE | 31.5 | $2.2 \cdot 10^{-11}$ |
| PVDC | HDPE | 32.5 | $3.8 \cdot 10^{-11}$ |

ALL-PLASTIC AIR FEEDER PIPE

FIELD OF THE INVENTION

This invention relates to air feeder pipes and specifically to air feeder pipes used for interconnecting metallic cable pressurization systems.

BACKGROUND OF THE INVENTION

Metallic wire or cable is widely used in the public switched telephone network to deliver signals to customers. Most of the metallic wire or cable consists of twisted copper pairs insulated with paper-pulp or polyethylene. The pairs are assembled into units and the units into cores covered by a protective sheath. The cables are placed in underground conduits, buried in trenches, or placed on poles or other aerial structures. The cables are therefore exposed to several different environmental conditions that may have a deleterious effect on transmission performance.

One such environmental condition affecting transmission performance is the build up of moisture in the cable. It is known in the art that a build up of moisture in metallic cable affects the electrical resistance of the copper pairs. In fact, the electrical resistance of the copper pairs is used to monitor moisture related transmission performance. Specifically, a properly performing copper pair exhibits an electrical resistance of 100 Megaohms (M$\Omega$). As moisture builds up in the cable core, the electrical resistance of the copper wire pairs is lowered. In the public switched telephone network transmission performance has been found to be acceptable where the copper wire electrical resistance is between 30 and 100 M$\Omega$. Furthermore, operation support systems are designed to generate alarms when the copper pair resistance drops to 15 M$\Omega$. Depending on the need for moisture protection, the cable core may be filled with petroleum jelly, may contain no filling at all, or may be kept under positive air pressure.

Where air pressure is used to keep water vapor or moisture away from the copper conductors, dry air is pressurized by compressors located in central offices and distributed by a network of half-inch diameter pipes to the copper cables. These pipes are designed to meet requirements set forth in Bellcore document TR-TSY-000206, *Technical Reference, Cable Pressurization Air Feeder Pipe*, Issue 1, April 1985, based on a March 1984 AT&T specification known as CA3131 and consist of a hollow laminated aluminum—polyethylene structure. The TR-TYS-000206 calls for a pipe intended for an environment having a maximum service temperature of 140° F. (60° C. ) and a maximum working pressure of 10 psig (68.9 kPag). The air feeder pipe was required to have a nominal inside diameter of approximately 0.6 inches and nominal outside diameter of approximately 0.7 inches. The polyethylene is then laminated to the outer exposed surface of the pipe and used as a jacket providing moisture protection. An outer mechanical sheet is allowed for additional moisture protection.

Air pipe systems developed and installed in accordance with the AT&T specification have become inadequate in supplying dry air to an expanding cable network. As more transmission cable is installed, the need arises to install more air feeder pipes. However, duct space in the underground conduit systems used to install air feeder pipe is scarce. In fact, in some instances telephone companies have run out of duct space to install more air pipes. In addition, leaks from these aging air pipe networks have forced the telephone operating companies to look for new approaches for supplying dry air to telephone cables. The installation of air feeder pipes having larger diameters has been proposed as a possible solution to the duct space exhaustion problem. Because a larger diameter pipe would be able to deliver significantly more dry air than the one half inch CA3131 pipe, the feeder pipe network would therefore be able to satisfy air delivery requirements while using significantly less pipe. In other words, fewer larger air pipes can feed more transmission cables.

An all-plastic pipe constructed of low-density polyethylene (LDPE) pipe having a nominal 1-inch inside diameter and without an aluminum moisture barrier has been considered as a possible replacement for CA3131 feeder pipe. However, because a 1-inch LDPE pipe exposes a larger surface area to the environment than the CA3131 pipe, the 1-inch LDPE pipe would significantly add more water vapor or liquid water into the pressurized air stream and, subsequently, to the void space of the cable, thereby significantly increasing the risk of transmission failure. Consequently a system employing air pipes constructed only of LDPE would require circulating pressurized air at a higher velocity than was previously required. Thus, in addition to replacing the pipes, an air feeder system employing all-plastic LDPE pipes may also require replacement of already existing air compressors. In fact, air feeder systems that have been deployed using an all-plastic LDPE pipe required replacement of the entire feeder plant and the addition of more monitoring gauges.

Another approach to solving the problem has been to place a metal barrier between an inner and outer layer of high density polyethylene (HDPE). While such an approach provides adequate moisture protection, it has some drawbacks. First, a metal barrier adds weight to the pipe which increases the tendency of the pipe to warp and/or kink during its lifecycle. Second, a metal barrier increases the susceptibility of the pipe to lightning. Third, the metal barrier decreases the flexibility of the pipe. Fourth, the metal barrier makes installation more difficult because the pipe is more difficult to cut, thereby increasing installation costs. Finally, corrosion of the metallic barrier poses a significant long term reliability risk.

Accordingly, a material that could be used to construct a larger diameter all-plastic pipe while providing adequate moisture protection would be of utility. In addition to providing adequate moisture protection, a pipe constructed from plastic materials must not be cost prohibitive and must be able to withstand both physical and environmental stresses.

SUMMARY OF THE INVENTION

My invention is an all-plastic air feeder pipe that is suitable for use in environments where moisture protection is required.

My pipe consists of an inner barrier material having a low enough permeability coefficient to provide adequate moisture protection and an outer layer material having a high permeability coefficient. Advantageously, the permeability coefficient of the inner barrier material is at least an order of magnitude lower than that of the outer layer material. By this combination of materials an economically feasible all plastic pipe that is able to provide adequate moisture protection may be constructed.

In accordance with my invention, a pipe constructed as described in the figures and detailed description provided below is also able to meet the strength and flexibility requirements needed over the operating temperature range and life of the pipe.

Furthermore, in accordance with my invention a metallic barrier is eliminated from air feeder pipes. Consequently, the susceptibility of these pipes to corrosion and lightning strikes while installed is eliminated.

BRIEF DESCRIPTION OF THE DRAWING

FIG. 1 is a list of commercially available thermoplastic pipe materials, their moisture permeability coefficients at 25° C., and their unit cost as of September 1998;

FIG. 2 gives the equivalent stiffness and moisture transmission rate for an all plastic air feeder pipe constructed from different materials.

DETAILED DESCRIPTION

Figure 3:
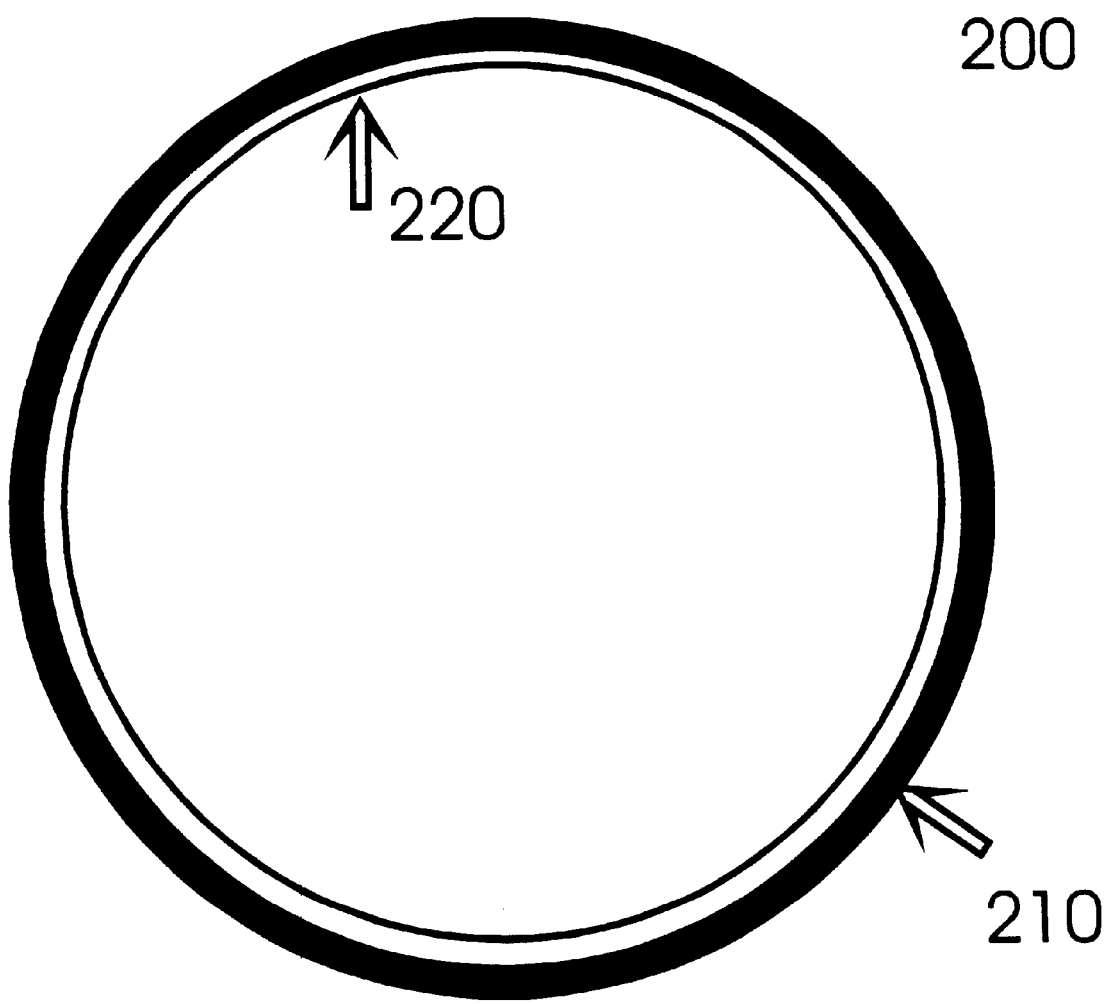
FIG. 3 depicts a cross-section of a composite pipe made in accordance with the present invention.

There are two important parameters that affect moisture protection for air feeder pipes, namely the permeability coefficient of the pipe material and the size of the pipe.

The permeability coefficient provides a measure of the ability of a material to transmit water vapor and/or liquid water through its thickness. Systems generally tend to reach a state of equilibrium. In an air pipe system, water vapor on the outside wall of the pipe seeks to cross into the pipe to come to equal concentration on both sides of the pipe. The rate at which water crosses over into the pipe is known as the water transmission rate. As previously discussed, polyethylene is a naturally porous material. Its porous qualities are further amplified by air feeder systems because of the propensity of the system to achieve an equilibrium. That is, in an air feeder pipe system the air placed into the pipe is essentially "bone dry." The air outside the pipe on the other hand may contain significantly more moisture. Therefore, there is a natural tendency of the water outside pipe to cross over into the pipe. This is exacerbated by the volume of air moving through pipe because, as the air is blown through the pipe, there is a tendency to pull even more water vapor into the pipe than would naturally cross over into the pipe.

Turning now to FIG. 1, there are shown commercially available feeder pipe materials along with their permeability coefficient at 25° C. and their published unit cost as of September 1998. LDPE is shown to have the largest permeability coefficient of all the materials explored during my work. Specifically, the permeability coefficient is $90 \times 10^{-10}$ $cm^3/cm^2 \cdot s$. On the other hand, LDPE is the least costly and has the lowest tensile modulus—55 to 172 MPa—of the materials shown. As previously discussed, the cost of the material is of particular import given the large number of pipes to be replaced; thus LDPE is particularly attractive from a cost standpoint. Of similar import is the tensile modulus or stiffness of the material. The tensile modulus is a measure of the flexibility and strength of the material to be used in making a pipe. Field installation and service/repair performance over the service temperature range require the pipe to be flexible and strong over its entire service life. Accordingly, the tensile modulus of LDPE has proven suitable for deployment in the telecommunications environment. Nonetheless, the high permeability coefficient of LDPE, as previously discussed, rules out using it for a larger diameter all-plastic feeder pipe.

Accordingly, an all-plastic air feeder pipe primarily has two performance constraints that must be suitably combined to produce a deployable product. These two additional performance constraints are stiffness and moisture permeability. An all-plastic pipe therefore must combine low stiffness and low moisture permeability in order to be considered as a suitable product. I have calculated the equivalent stiffness (equivalent stiffness is calculated by summing the product of the modulus of elasticity and the area moment of inertia for each layer of composite air feeder pipe) for a pipe having a one-inch inside diameter and one and half inch outside diameter made entirely of thermoplastic materials. I have also calculated the water transmission rate for a one-meter section of such an all plastic pipe. My calculations are given in tabular form in FIG. 2. As FIG. 2 clearly shows, an LDPE-FEP composite pipe is the best combination based on its equivalent stiffness and moisture transmission rate when compared to all other composite pipe combinations. Furthermore, as FIG. 2 shows, an all plastic pipe is also significantly more flexible than a pipe having an aluminum inner layer. Note too that although I did not calculate the moisture transmission rate of the pipe having an aluminum inner layer in FIG. 2, such a calculation is not important because the elimination of pipes having metallic inner layers is not based on their moisture transmission performance.

I have estimated that an air feeder pipe with the maximum acceptable water transmission rate should provide a moisture barrier with a permeability coefficient of approximately $15 \times 10^{-10}$ $cm^3$ per $cm^2$ of pipe external surface area per second unit pressure drop of one centimeter Hg across 1 centimeter pipe thickness. Any pipe where the pipe moisture permeability is below this maximum permeability coefficient increases the moisture related reliability in a pressurized cable network.

As my previous discussion makes clear, the water transmission rate and pipe diameter are related. That is, a larger diameter pipe has a larger surface area through which to transmit water and, therefore, in order to maintain the same level of moisture protection, the water transmission rate needs to be decreased by reducing the material permeability coefficient as the pipe diameter increases.

While the other materials listed in FIG. 1 have more than adequate permeability coefficients, they either cost too much or have too high a tensile modulus. Specifically, fluorinated ethylene-propylene copolymers (FEP) and poly (vinylidene chloride) (PVDC) have the lowest permeability coefficient and may be flexible and strong enough to be used in making air pipes. On the other hand, the cost of FEP and PVDC would prove to be much too costly of a solution by themselves for wide scale deployment. High-density polyethylene (HDPE) and Polypropylene (PP) are appropriately priced but their tensile modulus would prove much too high for an environment requiring flexibility.

Thus, in accordance with my invention and as shown in FIG. 3, a cross-section of a composite pipe 200 having a low cost high permeability outer layer 210 and an inner moisture barrier 220 wherein the permeability coefficient of the inner moisture barrier material is more than two orders of magnitude lower than the permeability coefficient of the outer layer material provides an effective low cost solution. Composite pipe 200 has a nominal inside diameter of one inch and an outside diameter of one and a half inches. The inner moisture barrier 220 of the pipe 200 is approximately one-sixteenth of an inch thick. The outer layer 210 is approximately three sixteenths of an inch thick. The outer layer 210 of composite pipe 200 is made of LDPE while the inner barrier 220 is made of either PVDC or FEP. A pipe made in the manner described meets both the performance characteristics and the cost requirements for air feeder pipes.

Although I have limited the above discussion to a one-inch diameter pipe, those skilled in the art will notice that much larger pipes can be made in accordance with my invention while at the same time meeting performance requirements. For example, in order to compensate for the larger surface area of a larger diameter pipe, the thickness of the inner barrier 220 may be increased. In general, regardless of the diameter of the pipe, those skilled in the art will note that by calculating the water vapor transmission rate for a given surface area, the thickness of the filter can be chosen so as to meet the maximum permeability coefficient. As the above discussion makes clear, my invention provides a low cost solution that is able to meet the flexibility, strength, and moisture protection requirements of the telecommunications environment.

The above description is exemplary of my invention. Numerous modifications and variations may be made by those skilled in the art without departing from the scope and spirit of my invention.

I claim:

1. A flexible all plastic air feeder pipe through which air is blown to conduits in which are placed electrical communication cables, the air keeping water vapor or moisture away from the cables and the air feeder pipe being of large enough diameter to accomodate the air flow to the conduits but which diameter increases the surface area of the air feeder pipe through which water vapor may cross from the outer surface of the air feeder pipe into the air within the air feeder pipe, said air feeder pipe comprising:

a continuous outer tubular pipe having an inner surface and comprising a material having a low tensile modulus and a first permeability coefficient; and means for preventing the water vapor or moisture from crossing from the outer surface of said tubular pipe into the air being distributed by said tubular pipe into the conduits, said means consisting of a continuous inner tubular moisture barrier directly affixed to said inner surface of said outer tubular pipe and coextensive therewith, said tubular moisture barrier having a second permeability coefficient at least an order of magnitude lower than said first permeability coeffcient;

said all plastic air feeder pipe being of the same construction over its entire length; and wherein said outer tubular pipe has a nominal inside diameter of at least one inch and said outer tubular pipe and said inner tubular moisture barrier have thicknesses so as to meet the relationship of the permeability coefficients of said outer tubular pipe and said tubular moisture barrier.

2. The flexible all plastic air feeder pipe in accordance with claim 1 wherein said outer tubular pipe has a nominal inside diameter of one inch and an outside diameter of one and half inches and said inner tubular moisture barrier is approximately three-sixteenths of an inch thick.

3. The flexible all plastic air feeder pipe in accordance with claim 2 wherein said outer tubular pipe comprises low density polyethylene and said inner tubular moisture barrier comprises fluorinated ethylene-propylene copolymers.

4. The flexible all plastic air feeder pipe in accordance with claim 2 wherein said outer tubular pipe comprises low density polyethylene and said inner tubular moisture barrier comprises poly (vinylidene chloride).

5. The flexible all plastic air pipe in accordance with claim 1 wherein said second permeability coefficient is more than two orders of magnitude lower than said first permeability coefficient.

6. The flexible all plastic air pipe in accordance with claim 1 wherein said inner tubular moisture barrier has a second permeability coefficient of less than $15 \times 10^{-10}$ cm$^3$ per cm$^2$.

* * * * *